United States Patent Office 3,418,386
Patented Dec. 24, 1968

3,418,386
HYDROGENATION OF CYCLOOCTADIENES TO CYCLOOCTENES
William K. Hayes, Trenton, N.J., assignor to Columbian Carbon Company, New York, N.Y., a corporation of Delaware
No Drawing. Filed July 5, 1966, Ser. No. 562,517
10 Claims. (Cl. 260—666)

ABSTRACT OF THE DISCLOSURE

A method is provided for selectively hydrogenating cyclooctadiene or substituted cyclooctadienes to the corresponding cyclooctene in which the material is overhydrogenated, beyond the point of maximum selectively for cyclooctene to such an extent that troublesome cyclooctadiene isomers such as 1,3-cyclooctadiene are substantially eliminated from the product, whereby purification procedures are greatly simplified.

---

This invention relates to the hydrogenation of olefinic compounds including the selective hydrogenation of less than the full number of carbon-to-carbon double bonds in polyolefinic compounds. Specifically, the process is in the use of hydrogen gas in the hydrogenation of cyclooctadienes, that is, compounds containing a carbocyclopolyolefinic nucleus having two double bonds, and containing 8 carbon toms in said nucleus, substituents attached to said nucleus being selected from the group consisting of the hydrogen radical, halide radicals, and lower alkyl radicals. Cyclooctadiene is preferred, and among the possible end products derived therefrom are cyclooctene and cyclooctane.

It has been previously reported in the literature that cycloolefinic compounds such as 1,5-cyclooctadiene may be hydrogenated with hydrogen gas utilizing a palladium on carbon catalyst to obtain cyclooctene. In practice, however, numerous difficulties are encountered in carrying out the reaction.

During selective hydrogenation of compounds having a plurality of carbon-to-carbon double bonds, there is a change in the rate of absorption or reaction of hydrogen after a given double bond is saturated, and such change in the rate of absorption has been utilized in the past as an approximate point at which to terminate the introduction of hydrogen to obtain a product having the desired number of double bonds. Following this procedure difficulties are encountered in controlling the hydrogenation properly. Even if precisely the theoretical quantity of hydrogen is introduced to give the desired product, isomerization, side reactions, degradation of starting material or intermediates or end products, ring collapse, ring splitting, and other reactions may occur depending upon conditions. For example, isomers may be formed by migration of double bonds which are difficult to separate by distillation or other procedures from the end product, and aromatic compounds may be formed. Of course, side reactions also reduce the quantity of desired product. It has been found in the past by some workers that a solvent is necessary; this creates the additional problem of separating solvent from products.

In the selective hydrogenation of a compound containing a cyclooctadienyl nucleus, to obtain partial reduction of the nucleus, there are few catalysts which are sufficiently selective, i.e., which will catalyze reduction of one double bond in a molecule while not affecting another double bond in the molecule. Even within a particular group of catalysts which are known to be somewhat selective, such as palladium metal on a support, differences within such classes of catalysts have been found to exist, some catalysts being less selective than others even though it would appear that they should be identical.

When compounds such as cyclooctadiene, having 8 carbon atoms in the nucleus and two double bonds, are hydrogenated to give a selectively hydrogenated nucleus having a single double bond, one of the problems is in the isomerization of the starting material. For example, in the case of 1,5-cyclooctadiene, during the course of the reaction compounds present include the starting material, as well as cis, cis-1,3 - cyclooctadiene, cis, cis - 1,4-cyclooctadiene, cyclooctene (cis and possibly trans), and cyclooctane. It has been found that at the point of maximum theoretical selectivity for cyclooctene and analogous compounds having the same number of carbon atoms in the cyclic nucleus, the reaction mixture commonly contains each of the mentioned compounds. Thus it is difficult to obtain a particularly pure cyclooctene, since some of these materials are extremely difficult to separate. For example, 1,3-cyclooctadiene has a boiling point very close to the boiling point for cyclooctene. Although less of a problem, 1,4-cyclooctadiene is also difficult to separate from cyclooctene. Side reactions of the cyclooctadienes include conversion thereof to aromatic hydrocarbons such as ethyl benzene, benzocyclobutene, and benzocyclobutane. It has been found that high temperatures, high catalyst concentrations, low hydrogen pressure or concentration, and/or inadequate agitation, may lead to or contribute to these side reactions.

On the other hand, where hydrogen pressure is too high, a larger proportion of the starting material is converted early in the reaction to fully saturated compounds such as cyclooctane. While this is an advantage if that is the desired end product and gives a faster reaction, in the event it is desired to terminate the reaction short of complete saturation of the nucleus, the application of high pressures is a disadvantage. Thus, while one might consider that optimum conditions, such as to give for example the fastest rate of reaction or the highest selectivity for the desired product would be preferred, it has been found according to the present invention that such conditions are undesirable.

The present invention eliminates or minimizes many of the problems and difficulties discussed above.

One improvement according to the present invention is to apply a higher but moderate hydrogen pressure during a first part of the reaction than is applied during a later or second portion of the reaction, which minimizes undesirable results.

Another feature of the invention is the discovery that at fixed catalyst concentrations and moderate hydrogen pressures lower temperatures will avoid difficulties noted above, and that high hydrogen pressures are to be avoided.

An additional and essential feature of the invention is the discovery that, instead of terminating the reaction at the theoretical point of maximum selectivity for the product, particularly when a carbocyclic nucleus containing one double bond is the desired end product, if hydrogen slightly in excess of the stoichiometric amount necessary is reacted with the reaction mixture, isomers and/or other undesirable products formed during the reaction or initially present which are difficult to separate by conventional means are thereby kept to a minimum.

Yet another feature of the invention is in the discovery that better results are obtained by controlled reduction in the hydrogen pressure during later stages of the reaction than are obtained by relying on the autogenous change in pressure when one or more double bonds are selectively saturated. Thus, further improvements in the hydrogenation of such cycloolefinic compounds to obtain a ring having a single double bond have been achieved by introducing from about 50% to about 90%, on a molar basis, of the hydrogen necessary to convert all of the starting material to the cyclomonoolefinic compound at an initially moderately high pressure, and thereafter, preferably progressively in a series of steps, reducing the pressure to a point where atmospheric pressure is approached.

It is to be understood that the foregoing improvements may be used singly, and, in combination, even further improvements are realized. Generally, it is preferred that the reaction be conducted in the liquid phase, and at elevated temperature and pressure, and in the presence of a hydrogenation catalyst, preferably a finely divided metallic palladium deposited upon a carbon substrate, also finely divided.

The foregoing and other features of the invention will be more readily understood by reference to the following detailed description.

Suitable cyclooctadienes includes 1,5-cyclooctadiene, 1,4 - cyclcooctadiene, 1,3 - cyclooctadiene, 1,6 - dimethyl-1,5 - cyclooctadiene, 1,5 - dimethyl - 1,5-cyclooctadiene, 1,5 - dichloro - 1,5 - cyclooctadiene, and analogous compounds having the same nucleus. Thus, in addition to hydrogen radicals, halide radicals and lower alkyl radicals may be present on the nucleus. As used throughout the specification and claims the term "lower alkyl radicals" is intended to denote radicals having from 1 to 5 carbon atoms, either as a straight chain or as a branched chain. The preferred starting material is 1,5-cyclooctadiene, particularly the one believed to be the cis,cis-stereoisomer, preferably of about 95% or greater purity. The impurities commonly comprise vinylcyclohexene and byproducts from the cyclization of butadiene. When using 1,5-cyclooctadiene, isomerization to the 1,3-isomer and the 1,4-isomer occurs during hydrogenation. The same may occur when using any isomer. Where the desired product is cyclooctene, the presence of the latter two isomers is a disadvantage since they are difficult to separate from the desired end product, particularly by distillation.

Such starting materials having a carbocyclic nucleus containing eight carbon atoms are suitably prepared by dimerization of butadiene, chloroprene, isoprene or similar compounds having a substituted or unsubstituted diolefinic chain of four carbon atoms and having conjugated unsaturation. Procedures for preparing these cycloolefinic compounds are well known in the art.

The products, having a cyclooctenyl nucleus, such as cyclooctene are useful as intermediates in that they may be ozonized and oxidized to yield the corresponding dicarboxylic acids, for example, which may in turn be used to prepare amides, esters, and other compounds, all by known processes.

The hydrogen is preferably at least about 95% pure, and is treated, if necessary, to remove diluents and catalyst poisons. Hydroformer and platformer hydrogen if used are also treated to remove carbon dioxide, carbon monoxide, sulfides if present, alkanes and alkenes, as by the use of molecular sieve absorbents. Where less pure hydrogen is utilized, it will be understood that the partial pressure of the hydrogen is taken into account when hydrogen pressure is used as a measure of the concentration of hydrogen.

The catalysts are metallic palladium or its reducible compounds on finely divided activated carbon, preferably charcoal derived from lignocellulosic material such as coconut shells, but suitably carbon black. Suitably the catalyst contains 1% to 6% palladium by weight, with those containing 4% to 5% palladium having been found to be particularly effective. Where the carbon is in the form of charcoal, it normally contains a small proportion of silica (e.g., 2–7%), small amounts of sodium (e.g., about 200–6000 parts per million) and traces of other elements including magnesium, lead, iron, aluminum, tin, copper, silver and titanium. One highly successful and preferred catalyst is based on charcoal, with metallic palladium deposited thereon, a major proportion of the palladium being such that it does not diffract X-ray radiation and the particle size of the carbon particles being substantially entirely less than 100 microns in size as determined by micromesh screen analysis. One of these preferred catalysts has, for instance, a surface area of about 1000 m.$^2$/g. and a pore volume of about 60–65 cm.$^3$/g., relative to nitrogen. Other similar preferred catalysts had a surface area of the carbon substrate or carrier in the range of about 600 to about 1200 m.$^2$/g. The examples herein relate to the use of the above-described preferred catalyst unless otherwise specified. While metallic palladium is preferred other metallic hydrogenation catalysts such as platinum, ruthenium, rhodium, nickel and others are useful, but they have been found to be less selective in hydrogenating cyclodiolefinic compounds having eight carbon atoms in the ring.

The following discussion is in connection with the hydrogenation or cyclooctadiene, but it will be understood that the same applies to the other cycloolefins included in the invention, substituted or unsubstituted, which contain 8 carbon atoms and 2 double bonds in the ring.

An important feature of the invention, as discussed briefly above, is in the discovery that by overhydrogenating the reaction mixture, that is, going beyond the point of maximum selectivity for cyclooctane where the starting material is cyclooctadiene, it is possible to obtain relatively high selectivity for cyclooctene while avoiding troublesome impurities such as 1,3-cyclooctadiene in the product. It has been found possible to achieve controlled overhydrogenation by means of the further modification of stepping down the hydrogen pressure when about 50% to 90% of the theoretical molar amount of hydrogen has been absorbed by reacting. In other words, the first portion of the reaction is conducted at a hydrogen pressure substantially higher than the later portion of the reaction. The preferred conditions are to conduct the first 50–90% of selective reduction at about 20–50 p.s.i.g. hydrogen pressure and the last 10–50% at a lower pressure of about 5–20 p.s.i.g. hydrogen pressure. A pressure no higher than about 10 p.s.i.g. in the final stages is still more desirable.

The extent of overhydrogenation is such that the mole ratio of cyclooctane (COA) to cyclooctadiene (COD) is at least about 1:1 and preferably less than about 10:0.1. At this ratio, which for 1,5-cyclooctadiene of over about 95% purity requires about 100.5% to 110%, on a molar basis, of the theoretical amount of hydrogen to obtain cyclooctene, substantially all of the troublesome 1,3- and 1,4-cyclooctadiene isomers formed during the reaction are eliminated. Thus, an aspect of this invention relates to the fact that these latter isomers may be eliminated in this manner. It will be understood that for less pure cyclooctadiene containing other unsaturated compounds, additional hydrogen may be consumed by the impurities.

It has also been found that at pressures of substantially above 100 p.s.i.g. with the preferred catalyst concentration of about 2% by weight, the selectivity for cyclooctane increases abnormally, even when the amount of hydrogen absorbed is about the theoretical amount to achieve reduction of only one of the double bonds of cis,cis-cyclooctadiene. As to the other important variables temperature is in the range of about 0° to 200° C., preferably about 80° to 100° C., pressure is from about 1 to 20 atmospheres absolute, preferably below 100 p.s.i.g. and more preferably 5 to 50 p.s.i.g. of hydrogen, and catalyst concentration, by weight, based on cyclodiolefin is 0.1% to 5%, preferably 0.5% to 1.5% by weight.

Aromatic compound formation by ring collapse is considered to be a catalytic phenomenon, and local "starvation" for hydrogen is thus to be avoided. Aside from inadequate agitation, high concentration of catalyst, low concentration of hydrogen in early stages of the reaction, and high temperatures are factors which tend to result in a burdensome proportion of compounds such as ethyl benzene, benzocyclobutane and benzocyclobutene. When such compounds are formed, hydrogen transfer takes place, an unmeasured amount of cyclooctadiene becomes unavailable for the desired product, and a corresponding increase of available hydrogen further complicates the problems. When it is considered that the variables of raw material purity, extent of hydrogenation, side reactions, temperature, catalyst concentration, hydrogen pressure, catalyst identity and so forth are for the most part dependent variables rather than independent variables, the tremendous number of possible permutations and combinations becomes apparent.

Control of the extent of hydrogenation is suitably by gas chromatography, refractive index, or halogenation.

To summarize, the preferred and even critical conditions in some instances, are important to success, and best results are obtained when the improvements are used in combination with one another. For best results the preferred palladium on carbon catalyst should be used, and overhydrogenation is to a point where the end product has a cyclooctane to cyclooctadiene mole ratio of between about 1 to 1 and 10 to 0.1. Preferred temperature is about 80° to 100° C. with hydrogen being of high purity and its pressure in the reaction zone being between about 5 and 50 p.s.i.g. In order to achieve the precise degree of overhydrogenation, it is of substantial benefit to utilize a higher but relatively moderate hydrogen pressure of about 20 to 50 p.s.i.g. during about the first 50–90% of the selective hydrogenation and a lower hydrogen pressure of about 5 to 20 p.s.i.g. during the last part of the reaction. All of the conditions are so controlled as to avoid the problems of ring collapse and difficultly separate impurities in the end product.

Work has been done with other cycloolefins, such as cyclododecatriene, but it has been found that the complex problems involved in selectively hydrogenating the cyclooctadiolefinic compounds are for the most part unique. Solutions for the problems involved in reducing one or more of the double bonds of say, cyclododecatriene are of little or no avail in solving the problems in selectively hydrogenating the cyclooctadienes.

Unless otherwise stated, the starting materials specified in the following illustrative examples had substantially the following analysis, and the process was conducted in the absence of solvent.

| Component: | Percent by weight |
|---|---|
| Cyclooctadiene | 97.5–99.5 |
| Vinylcyclohexene | 0.4–2.0 |
| Butadiene | Nil |
| Others | Nil–0.5 |

Examples 1a–1g

This example illustrates that by reacting more than the required amount of hydrogen necessary to selectively saturate one of the double bonds of 1,5-cyclooctadiene, it is possible to obtain a high yield of cyclooctene while minimizing difficultly separable byproducts. Also shown are the effects of using only about the theoretical amount of hydrogen, and of using an overly high hydrogen pressure. The reaction was conducted in a 500 milliliter autoclave with agitation, using 100 g. of cyclooctadiene. The catalyst was palladium on carbon, containing about 5% palladium.

The abbreviations have the following significance:

p.s.i.g.—pounds per square inch, gauge,
COE—cyclooctene,
COA—cyclooctane,
COD—cyclooctadiene.

| Run Number | $H_2$, p.s.i.g. | Approximate Mole Percent $H_2$ Absorbed | Temp., °C. | Reaction Duration, Minutes | Product Composition | | | | |
|---|---|---|---|---|---|---|---|---|---|
| | | | | | COE | COA | 1,5-COD | 1,4-COD | 1,3-COD |
| a | 50 | 106.2 | 75 | 57 | 91.5 | 7.2 | 0.5 | 0.5 | Trace |
| b | 50 | 102 | 75 | 27.5 | 94 | 3.8 | 1.0 | 0.9 | 0.1 |
| c | 50 | 91.2 | 75 | 36.5 | 89.2 | 2.2 | 3.3 | 5.0 | 0.2 |
| d | 50 | 104.8 | 40 | 51 | 93.2 | 5.7 | 0.5 | 0.4 | Trace |
| e | 25 | 100.5 | 75 | 46 | 95.2 | 2.5 | 1.0 | 1.0 | Trace |
| f | 35 | 100 | 125 | 22 | 93.2 | 2.8 | 2.6 | 1.1 | Trace |
| g | 125 | 100 | 125 | 5 | 90.0 | 6.0 | 3.1 | 1.0 | Trace |

Example 2

Using a similar procedure but utilizing a two gallon autoclave, four liters of 1,5-cyclooctadiene, and 23 grams of palladium on carbon catalyst containing 5% by weight of palladium, were charged to the reactor. The temperature was raised to a point within the range of about 100° C. to 110° C. More vigorous agitation than that used in Example 1 was utilized. Hydrogen was introduced at 50 p.s.i.g. until 105 mole percent of that necessary to obtain cyclooctene had been absorbed. The reaction time was between 45 and 55 minutes. A typical product showed the following analysis:

| Compound: | Percent |
|---|---|
| Cyclooctene | 94.7 |
| Cyclooctane | 5.1 |
| 1,4-cyclooctadiene | 0.2 |
| 1,5-cyclooctadiene | Trace |
| 1,3-cyclooctadiene | Nil |

Analysis was by gas chromatography. The figures given are on the basis of percent by weight as determined by relative peak areas of given components on the gas chromatogram. When known samples were made up by combining cyclooctane and cyclooctene for example, gas chromatography values were almost identical, in some cases varying a few one hundredths of one percent from the known values, thus indicating corresponding analyses. The known samples were made up of about 2.5% to 5% cyclooctane and 95% to 97.5% cyclooctene.

Examples 3a–3g

Using a similar procedure to the foregoing, but with 1.5% by weight of 5% palladium on carbon catalyst, this example was conducted with 1,5-cyclooctadiene at 75° C. and hydrogen at 25 p.s.i.g. until 105 mole percent of hydrogen had been absorbed. The results are as follows:

| Run | Time | Percent COA | Percent COE | Percent COD |
|---|---|---|---|---|
| a | 20 | 1.6 | 96.7 | 1.7 |
| b | 27 | 2.8 | 95.5 | 1.7 |
| c | 20 | 1.7 | 97.2 | 1.0 |
| d | 19 | 2.8 | 97.2 | Trace |
| e | 18 | 2.3 | 97.5 | .2 |
| f | 26 | 1.4 | 95.8 | 2.7 |
| g | 28 | .8 | 95.0 | 4.2 |

It will be noted that both the temperature and pressure were relatively low throughout the reaction.

Examples 4a and 4b

Hydrogenation of 1,5-cyclooctadiene was conducted in a batch reactor. The initial pressure in the reactor was maintained at 50 p.s.i.g. until 75% of the hydrogen necessary to obtain cyclooctene was reacted, then the pressure was lowered to 20 p.s.i.g. and the reaction was continued to the desired point. The results are as follows:

| Run | Percent COE | Percent COA | Percent COD-4 | Percent COD-5 |
|---|---|---|---|---|
| 4a | 95.6 | 4.1 | 0.3 | |
| 4b | 94.5 | 3.9 | 1.1 | 0.6 |

Still greater improvements are obtained with lower final pressures, and using the concentration of cyclooctadienes remaining as a criteria for terminating the reaction. Thus, preferred procedure is to terminate the reaction when the product shows a reduction in content of cyclooctadienes to 0.5%, with the introduction of an excess of hydrogen over that theoretically required.

Examples 5a-5f 1,5-cyclooctadiene in the amount of four liters was introduced into a two gallon autoclave with 1.4% by weight, based on the weight of cyclooctadiene, of a palladium or carbon catalyst containing 5% by weight of palladium. The temperature was raised to 100° C. and hydrogen was introduced into the reactor under a pressure of 50 p.s.i.g. After three fourths of the reaction time had passed the pressure was reduced to 20 p.s.i.g. and this pressure was maintained for the last one fourth of the reaction time. Total moles of hydrogen introduced was 102%–109% of that theoretically necessary to selectively saturate a single double bond in the starting material.

| Run No. | Mole Percent $H_2$ | Net Hydrogenation Time (Min.) | Refractive Index at end | Mole Percent of Products |||||| 
|---|---|---|---|---|---|---|---|---|---|
| | | | | COE | COA | COD-5 | COD-4 | COD-3 | Other |
| a | 107 | 124 | 1.4695 | 92.8 | 6.9 | 0.3 | Nil | Nil | |
| b | 109 | 139 | 1.4695 | 91.8 | 8.2 | Nil | Nil | Nil | |
| c | 103 | 124 | 1.4702 | 97.1 | 2.8 | | 0.1 | | |
| d | 104 | 144 | 1.4702 | 94.8 | 4.7 | | 0.5 | | |
| e | 102 | 61 | 1.4700 | 96.1 | 3.3 | Tr. | 0.3 | 0.3 | Nil |
| f | 104 | 61 | 1.4703 | 96.3 | 3.0 | 0.1 | 0.1 | Tr. | 0.5 |

Examples 6a-6t

Ten gallons of 1,5-cyclooctadiene and the catalyst, consisting of palladium on carbon and containing 5% palladium by weight, were introduced into a 15 gallon autoclave. The temperature was increased to 100° C. and an initial pressure of 50 p.s.i.g. of hydrogen was applied to the reactor. This pressure was continued until 80% of the total reaction time had passed, then the pressure was reduced to 15 p.s.i.g., and the latter pressure was maintained for the final part of the reaction. The same catalyst was retained through all runs, by being separated from the reaction product of the previous run and then introduced into the reactor for the next run; as indicated, there is little change in selectivity, although the reaction time was longer for the later runs. The total time for the hydrogenation ranged from 8 to 10 hours. About 101% to 110% mole percent of the amount of the hydrogen necessary to selectively reduce cyclooctadiene to cyclooctene was introduced. A catalyst concentration, by weight of COD, of 0.2% was used during runs 6a-6i, and 0.5% in runs 6j-6t.

| Run No. | Feed COD Purity, Percent | Product Analyses (percent) |||| COE Selectivity, Percent | Mole Percent $H_2$ |
|---|---|---|---|---|---|---|---|
| | | COE | COD | COA | Other | | |
| a | 98.3 | 93.8 | 1.2 | 3.4 | 1.6 | 96.5 | 103 |
| b | 98.2 | 91.6 | 0.4 | 6.4 | 1.6 | 93.5 | 106 |
| c | 98.2 | 92.4 | 0.5 | 5.7 | 1.4 | 94.2 | 106 |
| d | 98.2 | 92.8 | 2.2 | 3.6 | 1.4 | 96.2 | 101 |
| e | 98.2 | 93.6 | 0.6 | 4.4 | 1.4 | 95.5 | 104 |
| f | 98.2 | 92.9 | 1.0 | 4.9 | 1.3 | 95.0 | 105 |
| g | 98.2 | 92.6 | 0.6 | 5.1 | 1.7 | 94.8 | 107 |
| h | 98.2 | 93.9 | 0.3 | 4.3 | 1.4 | 95.6 | 106 |
| i | 98.2 | 91.5 | 1.0 | 6.5 | 1.0 | 93.4 | 106 |
| j | 98.2 | 96.6 | 0.9 | 1.9 | 0.6 | 98.1 | |
| k | 98.0 | 93.1 | 1.3 | 4.5 | 1.1 | 95.5 | |
| l | 98.0 | 92.5 | 1.5 | 4.5 | 1.5 | 95.5 | |
| m | 98.0 | 94.9 | 1.1 | 2.8 | 1.2 | 97.1 | |
| n | 98.0 | 95.2 | 1.2 | 2.5 | 1.1 | 97.5 | |
| o | 98.0 | 95.9 | 0.8 | 2.5 | 0.8 | 97.5 | |
| p | 98.8 | 95.9 | 1.0 | 2.4 | 0.7 | 97.6 | |
| q | 98.8 | 96.3 | 1.1 | 1.9 | 0.7 | 98.0 | |
| r | 98.8 | 96.0 | 0.5 | 2.6 | 0.9 | 97.3 | |
| s | 98.8 | 94.4 | 0.6 | 3.9 | 1.1 | 96.0 | |
| t | 98.8 | 94.0 | 0.8 | 4.0 | 1.2 | 96.0 | |

"Selectivity" is based on the amount of cyclooctadiene starting material actually converted to other products, thus taking feed purity into account. The conversion of the initial starting material to other products is shown by the amount of COD remaining after the reaction.

Examples 7a-7j

The general procedure of these runs is the same as those in Example 6. The major difference lies in the method of control analysis during the runs, i.e. a chromatographic analysis was employed rather than refractive index. This allowed a much closer control of the end point of the reaction which is reflected by the improved selectivities.

The amount of hydrogen added in all of these runs was dependent upon the selectivity. The more COA formed, the more hydrogen was added. The control analysis made during each run provided the basis for this. The criteria used to determine the end point was COD content. In these runs, 1.0% or less was the goal. In later runs, as techniques improved both in procedure and analysis, this was changed to 0.5% or less COD. These runs were made with a fresh batch of catalyst identical with that used in earlier examples, except that the water with the catalyst was removed before the catalyst was charged to the reactor.

| Run No. | Mole percent $H_2$ | Feed COD Purity, percent | Product Analysis (percent) |||| Selectivity, percent |
|---|---|---|---|---|---|---|---|
| | | | COE | COD | COA | Other | |
| a | 101 | 98.8 | 96.4 | 1.0 | 2.3 | 0.3 | 97.7 |
| b | 101 | 98.8 | 97.8 | 0.9 | 0.9 | 0.4 | 99.1 |
| c | 101 | 98.8 | 97.7 | 0.7 | 1.1 | 0.5 | 98.9 |
| d | 100 | 99.3 | 97.8 | 1.0 | 1.0 | 0.2 | 99.0 |
| e | 100 | 99.3 | 97.1 | 1.7 | 1.0 | 0.3 | 99.0 |
| f | 101 | 99.3 | 97.9 | 0.9 | 1.1 | 0.6 | 98.9 |
| g | 101 | 99.3 | 97.2 | 0.7 | 1.6 | 0.5 | 98.4 |
| h | 103 | 99.3 | 96.2 | 0.7 | 2.5 | 0.8 | 97.5 |
| i | 004 | 99.3 | 95.8 | 0.2 | 3.2 | 0.8 | 96.8 |
| j | 104 | 99.3 | 95.8 | 0.2 | 3.2 | 0.8 | 96.8 |

Examples 8a-j

Using similar conditions, a palladium and carbon catalyst containing 5% palladium and a concentration of about 1% based on the weight of the cyclooctadiene but using an impure hydrogen and a temperature of 75° C. gave results comparable to the use of pure hydrogen. The average selectivity for cyclooctene differed only 0.2% in using the two hydrogen sources. The cyclooctadiene was passed through a column of silica gel prior to hydrogenation, one change being a reduction in phenol content from 450 parts per million (p.p.m.) to 45 p.p.m., and another change being removal of polymerization inhibitor, when present. The hydrogen was that recovered from a "platformer" treatment of hydrocarbons. The hydrogen, 88% pure, contained about 12% of lower (1–6 carbon atoms) hydrocarbon vapors and trace quantities of hydrogen sulfide, carbon dioxide, and carbon monoxide. The gas prior to being used was passed through a column containing solid sodium hydroxide deposited on asbestos to remove hydrogen sulfide, and then was passed over a molecular sieve adsorbent to remove carbon dioxide, carbon monoxide, and a small proportion of the hydrocarbons. The unreacted materials from the platformer hydrogen which accumulated in the reactor were periodically vented. An excess of hydrogen over that theoretically necessary was used with the following results.

| Run No. | Feed COD Purity, percent | Product Analysis, percent | | | | Selectivity, percent |
|---|---|---|---|---|---|---|
| | | COE | COA | COD | Others | |
| a | 99.2 | 95.1 | 2.6 | 1.2 | 1.1 | 97.3 |
| b | 99.2 | 94.0 | 3.5 | 1.6 | 0.9 | 96.5 |
| c | 99.2 | 96.0 | 2.7 | 0.5 | 0.8 | 97.2 |
| d | 99.2 | 93.7 | 4.6 | 0.9 | 0.8 | 95.5 |
| e | 99.2 | 94.9 | 3.1 | 1.0 | 1.0 | 96.8 |
| f | 99.2 | 94.8 | 3.2 | 0.9 | 1.1 | 96.7 |
| g | 99.2 | 95.6 | 2.9 | 0.6 | 1.1 | 97.1 |
| h | 99.2 | 95.2 | 2.7 | 0.8 | 1.3 | 97.2 |
| i | 99.2 | 95.3 | 2.8 | 0.9 | 1.0 | 97.2 |
| j | 99.2 | 95.0 | 2.8 | 1.1 | 1.1 | 97.2 |

Using a similar procedure, but with a mixture containing 67% by volume of hydrogen and 33% by volume of nitrogen to reduce cyclooctadiene to cyclooctene, the temperature being 100° C., total reactor pressure 76 p.s.i.g., and catalyst concentration being 1% by weight, with intense agitation, gave the following results:

| Run | Product Analysis | | | | Selectivity |
|---|---|---|---|---|---|
| | COE | COA | COD | Others | |
| a | 95.0 | 3.0 | 1.0 | 0.8 | 96.9 |
| b | 95.6 | 3.3 | 0.4 | 0.6 | 96.7 |
| c | 95.2 | 3.0 | 1.2 | 0.6 | 96.9 |

I claim:
1. In a process of selectively hydrogenating one of the double bonds of a compound having a cyclooctadienyl nucleus, substituents attached to said nucleus being selected from the group consisting of hydrogen, halide radicals, and lower alkyl radicals, to obtain a compound having a cyclooctenyl nucleus, said hydrogenation being by means of hydrogen gas and a hydrogenation catalyst, the improvement of overhydrogenating beyond the point of maximum selectivity for the compound having a cyclooctenyl nucleus and beyond the point of minimum selectivity for a compound containing a cyclooctanyl nucleus, to an extent where the molar ratio of cyclooctanyl compound to cyclooctadienyl compound in the end product is at least 1:1, and the quantity of hydrogen reacted to achieve said overhydrogenation is from about 100.5% to 110%, on a molar basis of the theoretical amount necessary to obtain said cyclooctenyl nucleus.

2. The process of claim 1 wherein the quantity of hydrogen present at any given time is less than that corresponding to a hydrogen pressure of about 100 p.s.i.g., relative to hydrogen of at least about 95% purity.

3. The process of claim 2 in which the first portion of the hydrogenation is conducted at a hydrogen pressure of up to about 50 p.s.i.g. and the last portion is conducted at a lower hydrogen pressure of less than about 20 p.s.i.g.

4. The process of claim 3 in which the molar ratio of cyclooctanyl compound to cyclooctadienyl compound is less than about 10:0.1, about the first 50–90% of the selective hydrogenation of said one double bond on a molar basis is conducted at a hydrogen pressure of between about 20 and 50 p.s.i.g. and the last portion of said hydrogenation is at a lower pressure between about 5 and 20 p.s.i.g.

5. The process of claim 4 in which said cyclooctadienyl compound is 1,5-cyclooctadiene and the product is cyclooctene.

6. The process of claim 4 in which said catalyst is finely divided metallic palladium deposited on activated carbon containing about 1% to 6% by weight of palladium, said catalyst being present in the amount of about 0.1% to 5%, based on cyclooctadiene.

7. The process of claim 6 in which the reaction temperature is kept below about 100° C.

8. The process of claim 3 in which said cyclooctadienyl compound is 1,5-cyclooctadiene and the product is cyclooctene, and said catalyst is finely divided metallic palladium deposited on activated vegetable charcoal.

9. In a process of selectively hydrogenating 1,5-cyclooctadiene to cyclooctene using a palladium catalyst and gaseous hydrogen, the improvements in combination of hydrogenating said cyclooctadiene beyond the point of maximum selectivity for cyclooctene to an extent that the molar ratio of cyclooctane to 1,5-cyclooctadiene in the product is between about 1:1 and 10:0.1, the reaction is conducted at a temperature below about 100° C., about the first 50% to 90% of the reaction is conducted at a hydrogen pressure, based on hydrogen of at least about 95% purity, of between about 20 p.s.i.g. and 50 p.s.i.g., and the last portion of the reaction is conducted at a lower hydrogenation pressure below 20 p.s.i.g.

10. The process of claim 9 in which said cyclooctadiene is at least about 95% pure, said palladium is deposited on charcoal, the reaction is conducted in the absence of solvent, and the last portion of said reaction is conducted at a hydrogen pressure below about 10 p.s.i.g.

References Cited

UNITED STATES PATENTS

| 2,360,555 | 10/1944 | Evans | 260—666 |
| 3,022,359 | 2/1962 | Wiese | 260—666 |
| 3,108,142 | 10/1963 | Reppe | 260—666 |
| 3,251,892 | 5/1966 | Seefelber | 260—666 |
| 3,336,404 | 8/1967 | Chappell | 260—666 |

FOREIGN PATENTS

| 932,226 | 7/1963 | Great Britain. |

DELBERT E. GANTZ, *Primary Examiner.*

V. O'KEEFE, *Assistant Examiner.*